United States Patent Office 3,124,551
Patented Mar. 10, 1964

3,124,551
STABILIZED POLYPROPYLENE COMPOSITION CONTAINING AN A-STAGE PHENOLIC RESIN AND A PHOSPHORUS-CONTAINING COMPOUND
George W. Warren, Columbus, Ohio, assignor to Union Carbide Corporation, a corporation of New York
No Drawing. Filed Apr. 28, 1960, Ser. No. 25,191
14 Claims. (Cl. 260—43)

This invention relates to improved propylene polymer compositions. More particularly, it relates to polypropylene having greatly increased resistance to light and thermal degradation and being substantially lighter in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their high stiffness moduli.

Unfortunately, propylene polymers are subject to severe deterioration from the oxidative action of air at elevated temperatures. For examples, fibers that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

While it is known that small amounts of some antioxidants, for example, 4,4'-thio-bis(6-tertiarybutyl-3-methylphenol), 2,2-bis(4-hydroxyphenyl)propane, diphenylamine, etc., can be added to polypropylenes to prevent degradative effects during the short period the polymer is heated for melt spinning to produce fibers, it is not possible by the use of these conventional and well known antioxidants to prevent the oxidative degradation that occurs over prolonged exposure to air at temperatures below the melting temperature of polypropylene. For example, the inclusion in a polypropylene fiber of two percent by weight of 4,4'-thio-bis(6-tertiarybutyl-3-methylphenol) alone which is known to be one of the most effective antioxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiaryalkylphenolformaldehyde resins. The so-stabilized polypropylene compositions are most resistant to air oxidation and thermal degradation during compounding and are able to endure the forming temperatures with no significant reduction of strength or electrical properties. However, relatively large concentrations, i.e., 0.1 to 1 percent or more are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide polypropylene compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a p-tertiaryalkylphenol-formaldehyde resin stabilizer and an organic phosphite compound which inhibits discoloration and in many instances exerts some stabilizing effect on the composition.

The low molecular weight para-tertiaryalkylphenol-formaldehyde resins suitable for use in this invention are the A-stage resins produced by the reaction of para-tertiaryalkylphenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermedite stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as antioxidants in this invention are those produced by the reaction of para-tertiary-alkyl-phenols with formaldehyde in the presence of a suitable catalyst, such as oxalic acid, by procedures which are well known in the plastics art. Among the para-tertiaryalkylphenols which can be used in producing the suitable A-stage resins by reaction with formaldehyde are the para-tertiaryalkylphenols, in which the alkyl group contains from 4 to about 20 carbon atoms, or more, preferably from about 4 to about 10 carbon atoms, such as para-tertiarybutylphenol, para-tertiaryamylphenyl, para-tertiaryheptylphenol, para-tertiarynonylphenol and the like.

Illustrative of the A-stage resins that can be used to control the oxidative degradation of the polypropylene are para-tertiarybutylphenol-formaldehyde resin, para-tertiaryamylphenol-formaldehyde resin, para-tertiarynonylphenol-formaldehyde resin, para-tertiarydodecylphenol-formaldehyde resin and the like. The resins can be prepared from the pure para-phenol or from a mixture of para phenol with the ortho and/or meta isomers. However, the effectiveness of the A-stage resins as anti-oxidants is dependent in very large measure upon the para-tertiaryalkylphenol-formaldehyde resin. Thus, even though an A-stage resin formed from the mixture of isomeric alkylphenols having a major proportion of the para isomer is an effective constituent of the present compositions, larger quantities of the A-stage resin are needed in order to have a sufficient concentration of the para-tertiaryalkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The organic phosphite compounds suitably employed in the compositions of this invention are those corresponding to the general formula

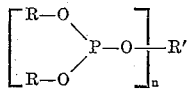

wherein each R is individually a monovalent hydrocarbon radical having from 1 to about 10 carbon atoms, $n$ is an integer having a value of from 2 to 4 and R' is an inert polyvalent organic radical having a valence equal to $n$ and containing terminal methylene groups, each individual phosphite group $[(RO)_2-P-O]$ being bonded to R' through one of said terminal methylene groups. For instance, R' can be a hydrocarbon radical or a hydrocarbon substituted radical such as $(CH_2)_x$; $(CH_2)_x]_3CH$; $(CH_2)_x]_4C$; $(CH_2)_x]_3N$; and the like, in which $x$ is an integer from 1 to about 12, but is preferably from 1 to 4.

While R can be any hydrocarbon group having up to about 10 carbon atoms, the preferred groups are monovalent saturated aliphatic and monovalent aromatic hydrocarbons, with the monovalent aromatic radicals being especially preferred.

It is to be understood that the term "monovalent aromatic radical" is intended to include phenyl and naphthyl radicals containing ring substituted halogen, and/or hydroxyl, and/or alkyl radicals, and that the term "monovalent saturated aliphatic hydrocarbon radical" does not preclude hydrocarbon radicals having halogen and/or hydroxyl and/or aryl substituent groups, which substituent groups do not substantially alter the fundamental chemical nature of the hydrocarbon radicals and are not determinative of the decolorizing properties of the phosphorus compounds employed in the practice of this invention.

Because of their ready availability and especially excellent ability to decolorize the phenolic stabilized polypropylene composition of this invention, phosphite compounds corresponding to any of the following three general formulae as particularly preferred compounds:

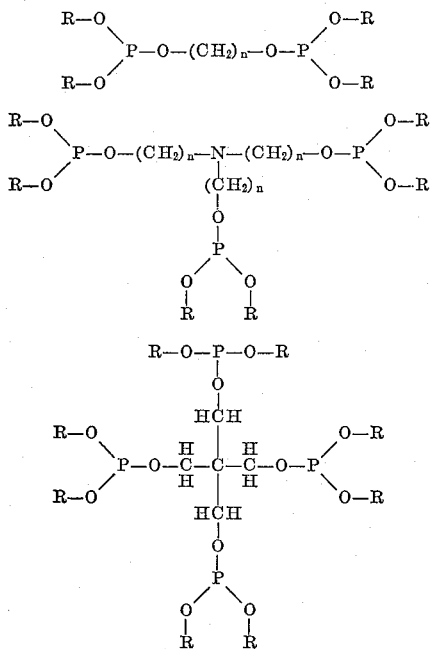

wherein in each occurrence in any of the general formulae above, $n$ is individually an integer having a value of from 1 to 10 inclusive, and R in each occurrence is individually selected from the group consisting of a saturated monovalent aliphatic hydrocarbon radical containing from 1 to 10 aliphatic carbon atoms, and a monovalent aromatic radical containing not more than 10 carbon atoms in the aromatic nucleus.

Specifically illustrative of the organic phosphites coming within the scope of the present invention, but in no way limitative thereof, are tetraphenyl ethylene diphosphite;
tetraphenyl 1,4-butanediol diphosphite;
tetraethyl 1,7-heptanediol diphosphite;
tetrabutyl 1,5-pentanediol diphosphite;
tetra(2-chlorophenyl) ethylene diphosphite;
tetracresyl 1,3-propanediol diphosphite;
tetra(2-hydroxyethyl) 1,8-octanediol diphosphite;
tris(2-diphenylphosphitoethyl)-amine;
tris[di(hydroxyethyl)phosphitobutyl]amine;
tris(2-diisooctylphosphito-n-amyl)amine;
tris(2-bromoethylphosphito-n-hexyl)amine;
tris(2-dicresylphosphitoethyl)amine;
tetra(diphenylphosphito)pentaerythritol;
tetra(dicresylphosphito)pentaerythritol;
tetra[di(chloroethyl)phosphito]-pentaerythritol;
tetra[di(phenylethyl)phosphito]pentaerythritol;
tetra(di-n-hexylphosphito)pentaerythritol;
tetranaphthyl ethylene diphosphite;
tris(2-dinaphthylphosphitoethyl)amine; and the like.

Propylene resin compositions having vastly improved thermal stability without any significantly greater discoloration over compositions containing only a phenolic resin stabilizer are, according to this invention, those which contain from about 0.05 percent by weight to about 5.0 percent by weight or greater, preferably from about 0.5 to about 2.0 percent by weight, of an A-stage para-tertiaryalkylphenol-formaldehyde resin hereinbefore described, based on the weight of the propylene polymer present, and in combination therewith, an organic phosphite as hereinbefore described in an amount of from about 10 to about 600 percent, preferably from about 100 to about 400 percent, by weight based on the weight of the phenolic resin stabilizer present.

Whereas the production of A-stage phenolic resin to propylene polymer, and the proportion of the organic phosphite decolorizer to A-stage phenolic resin as set forth above are satisfactory to produce a stable product having a color sufficiently light for all but the most unusual use requirements, it is to be understood that greater or lesser quantities of either the phenolic resin or the phosphite decolorizer can be utilized without departing from the spirit and proper scope of the present invention. In a practical sense, however, greater latitude can be exercised with respect to the concentration of the phenolic resin than with the organic phosphite.

The para-tertiaryalkylphenol-formaldehyde resin-organic phosphite stabilizer composition can be incorporated into the polypropylene by any suitable means, for example, by fluxing the polypropylene with the stabilizer composition on heated rolls, by the use of Banbury mixers, or of heated extruders, and the like, or by the use of a solvent solution of the stabilizer.

The following examples will serve to further illustrate the present invention.

In the examples, at each occurrence the following definitions and characterizations apply except where otherwise indicated:

*Phenolic stabilizer.*—An A-stage p-tert-butylphenol-formaldehyde resin having a softening point of 266° F. and a specific gravity of 1.04 prepared by the oxalic acid catalyzed condensation of p-tert-butylphenol and formaldehyde under reflux conditions. The condensation product mass was then vacuum distilled to remove formed water, unreacted phenol, and low molecular weight condensation products, and thereafter cooled and ground.

*Polypropylene resin.*—The propylene homopolymer employed is a typical normally solid polypropylene having a melt index of 3.1 decigrams per minute, a density of 0.908 gram per milliliter at 23° C. and a tensile modulus of 138,000 pounds per square inch.

*Whiteness.*—Whiteness is indicated by the percentage reflectance on molded plaque samples using a wave length of 550 mμ, and using vitrolite as the arbitrarily chosen reflectance standard. The color which develops in a polypropylene composition such as those tested is related directly to the whiteness value, i.e., the higher the percentage reflectance, the whiter the composition. The improvement in color in any of the polypropylene compositions containing a phenolic resin stabilizer and a phosphorus-containing compound of the present invention is readily appreciated by comparison of the whiteness value thereof with whiteness values of compositions containing the same propylene resin and phenolic stabilizer, but containing none of the instant decolorizers.

*Oxidative resistance.*—The ability of the polypropylene composition to resist oxidative degradation in air at elevated temperatures. The compositions of the present invention were, according to conventional procedure, melt spun into uniform filaments of about 125 denier. A number of these filaments were taken together to form a yarn or multifilament fiber, a portion of which was then tested on a Scott IP-2 tester for fiber tenacity using a 10 inch gauge length. The remaining portion was wrapped on a wire rack and placed in an air oven at 125° C. At measured intervals thereafter, five 5″ gauge lengths were removed from the oven and tested on the Scott IP-2 tester. With increasing oxidation the tenacity of the filaments of the yarn decreased until no significant tensile force could be applied without rupture of the yarn. The oven induction period required to accomplish this result is indicative of the effectiveness of the stabilizer additives presence.

EXAMPLES 1–5

The substantially enhanced thermal stability and improved color of the polypropylene compositions of the present invention were demonstrated by preparing a series of polypropylene compositions containing both a phenolic resin stabilizer and a phosphorus compound. For control the same polypropylene was admixed with the same p-tert-butylphenolformaldehyde resin to form two compositions, one containing 0.5% by weight of the phenolic resin, and the other containing 1.0% by weight. Each of the compositions prepared was heat blended on a sheet of polytetrafluoroethylene heated to 220° C. The compositions were removed from the polytetrafluoroethylene sheet after having achieved the molten state for a period of 1 minute. The results of all the tests are reported in Table I below:

*Table I*

| Ex. | Propylene Compositions | | | Whiteness Value | Oxidation Resistance[b] |
|---|---|---|---|---|---|
| | Additive | | Conc. of Additive (wt. percent)[a] | | |
| | None | | | 46 | 4 |
| | p-t-butylphenol/CH$_2$O resin | | 0.5 | 25 | ~180 |
| | ----do---- | | 1.0 | 19 | 300 |
| 1 | { tetraphenyl ethylene diphosphite. | | 1.0 | 37 | ~270 |
| | { p-t-butylphenol/CH$_2$O resin | | 1.0 | | |
| 2 | { tetrabutyl 1,5-pentanediol diphosphite. | | 1.0 | 30 | |
| | { p-t-butylphenol/CH$_2$O resin | | 1.0 | | |
| 3 | { tetraisooctyl 1,5-pentanediol diphosphite. | | 1.0 | 30 | |
| | { p-t-butylphenol/CH$_2$O resin | | 1.0 | | |
| 4 | { tris(2-diphenylphosphitoethyl)amine. | | 1.0 | 32 | |
| | { p-t-butylphenol/CH$_2$O resin | | 1.0 | | |
| 5 | { tetra(diphenylphosphito)pentaerythritol. | | 1.0 | 33 | |
| | { p-t-butylphenol/CH$_2$O resin | | 1.0 | | |

[a] Based on the weight of polypropylene.
[b] Induction period in air at 125° C., hrs.

EXAMPLE 6

The effect of various concentrations of phosphorus compound and phenolic resin on the whiteness value of the polypropylene compositions was determined using the same propylene polymer, phenolic resin stabilizer and test methods as in Examples 1–5. As the phosphorus-containing compound tetraphenyl ethylene diphosphite was employed in amounts varying from 0.5 to 3.0 percent by weight based on the weight of the polypropylene. The whiteness values for a number of combinations are set forth below in Table II.

*Table II*

| Whiteness | Concentration of (weight percent)[1] | |
|---|---|---|
| | Tetraphenyl ethylene diphosphite | p-Tertiary-butylphenol formaldehyde resin |
| 46 | 0 | 0 |
| 36 | 0.5 | 2.0 |
| 44.2 | 2.0 | 2.0 |
| 44.0 | 3.0 | 2.0 |
| 39.5 | 0.5 | 0.5 |
| 43.8 | 2.0 | 0.5 |
| 38.0 | 3.0 | 0.5 |
| 40.0 | 0.5 | 0 |
| 38.0 | 2.0 | 0 |
| 36.5 | 3.0 | 0 |
| 25.0 | 0 | 0.5 |
| 19.0 | 0 | 1.0 |
| 11.0 | 0 | 2.0 |
| 8.0 | 0 | 3.0 |
| 8.0 | 0 | 4.0 |

[1] Based on the weight of polypropylene.

As indicated in the above table, the color improvement shown by these particular color-improving agents is not influenced greatly by large concentration differences in either the phenol-formaldehyde resin or the color improving agent.

The polypropylene compositions of the present invention find particular utility, because of their resistance to oxidative degradation and discoloration, as extruded or spun textile fibers and yarns. These compositions find additional utility in the form of films and sheets suitable for packaging, and in the form of a wide variety of extruded and molded articles. The propylene resins effectively stabilized by the stabilizer compositions of the present invention include copolymers of propylene and other olefinically unsaturated monomers such as ethylene and propylene provided the propylene interpolymerized therein is present in an amount of at least about 50 percent by weight, preferably at least about 80 percent by weight. The term "propylene resin" or "propylene polymer" as used herein is intended, therefore, to include such copolymers as well as propylene homopolymers.

The composition can also include conventional additives such as colorants, lubricants, slip agents, plasticizers, fillers and the like, and can be admixed with other polymeric materials either compatible or incompatible with polypropylene.

What is claimed is:
1. A propylene resin composition having improved stability toward heat and light induced molecular degradation and being stable toward color development which comprises a normally solid propylene polymer, a stabilizing amount of an A-stage para-tertiaryalkylphenol-formaldehyde resin in which the alkyl group of the para-tertiaryalkylphenol contains from 4 to 20 carbon atoms, and a decolorizing amount of a phosphorus compound having the general formula

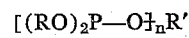

wherein each R is individually a monovalent hydrocarbon radical having from 1 to 10 carbon atoms, $n$ is an integer having a value of from 2 to 4, and R' is an inert polyvalent organic radical having a valence equal to $n$ and containing terminal methylene groups through which chemical bonding to each [(RO₂)P—O] occurs.

2. The composition of claim 1 wherein the decolorizing phosphorus compound has the general formula $$(RO)_2—P—O—(CH_2)_x—O—P—(OR)_2$$

wherein in the general formula $x$ represents an integer having a value of from 1 to 10, R in each occurrence is individually a monovalent hydrocarbon radical containing from 1 to 10 carbon atoms and free of aliphatic unsaturation.

3. The composition of claim 2 wherein the A-stage p-tertiaryalkylphenol-formaldehyde resin is present in an amount of from about 0.05 to about 5.0 percent by weight based on the weight of the propylene polymer present, and the phosphorus-containing decolorizer is present in an amount of from about 10 to about 600 percent by weight based on the weight of the A-stage phenolic resin.

4. The composition of claim 3 wherein the phosphorus-containing decolorizer is present in an amount of from about 100 to about 400 percent by weight based on the weight of the A-stage phenolic resin.

5. The composition of claim 4 wherein the phosphorus compound is tetraphenyl ethylene diphosphite.

6. The composition of claim 1 wherein the decolorizing phosphorus compound has the general formula $$[(RO)_2—P—O—(CH_2)_x]_3N$$

wherein in each occurrence in the general formula $x$ is an integer having a value of from 1 to 10, R in each occurrence is individually a monovalent hydrocarbon radical containing from 1 to 10 carbon atoms and free of aliphatic unsaturation.

7. The composition of claim 6 wherein the A-stage p-tertiaryalkylphenol-formaldehyde resin is present in an amount of from about 0.05 to about 5.0 percent by weight based on the weight of the propylene polymer present, and the phosphorus-containing decolorizer is present in an amount of from about 10 to about 600 percent by weight based on the weight of the A-stage phenolic resin.

8. The composition of claim 7 wherein the phosphorus-containing decolorizer is present in an amount of from about 100 to about 400 percent by weight based on the weight of the A-stage phenolic resin.

9. The composition of claim 7 wherein the phosphorus compound is tris(2-diphenylphosphitoethyl) amine.

10. The composition of claim 1 wherein the decolorizing phosphorus compound has the general formula $$[(RO)_2—P—O—(CH_2)_x]_4C$$

wherein in each occurrence in the general formula $x$ is an integer having a value of from 1 to 10, R in each occurrence is individually a monovalent hydrocarbon radical containing from 1 to 10 carbon atoms and free of aliphatic unsaturation.

11. The composition of claim 10 wherein $x$ has a value of 1.

12. The composition of claim 10 wherein the A-stage p-tertiaryalkylphenol-formaldehyde resin is present in an amount of from about 0.05 to about 5.0 percent by weight based on the weight of the propylene polymer present, and the phosphorus-containing decolorizer is present in an amount of from about 10 to about 600 percent by weight based on the weight of the A-stage phenolic resin.

13. The composition of claim 12 wherein the phosphorus-containing decolorizer is present in an amount of from about 100 to about 400 percent by weight based on the weight of the A-stage phenolic resin.

14. The composition of claim 13 wherein the phosphorus compound is tetra(diphenylphosphito)pentaerythritol.

References Cited in the file of this patent

UNITED STATES PATENTS

| | | |
|---|---|---|
| 2,163,637 | Thomas | June 27, 1939 |
| 2,240,582 | Sparks | May 6, 1941 |
| 2,612,488 | Nelson | Sept. 30, 1952 |
| 2,728,789 | Morris et al. | Dec. 27, 1955 |
| 2,841,607 | Hechenbleikner et al. | July 1, 1958 |
| 2,847,443 | Hechenbleikner et al. | Aug. 12, 1958 |
| 2,968,641 | Roberts et al. | Jan. 17, 1961 |
| 2,985,617 | Salyer et al. | May 23, 1961 |
| 3,013,003 | Maragliano et al. | Dec. 12, 1961 |
| 3,020,259 | Schulde et al. | Feb. 6, 1962 |